(12) United States Patent
Anglin et al.

(10) Patent No.: US 8,738,575 B2
(45) Date of Patent: May 27, 2014

(54) DATA RECOVERY IN A HIERARCHICAL DATA STORAGE SYSTEM

(75) Inventors: Matthew J. Anglin, Tucson, AZ (US);
David M. Cannon, Tucson, AZ (US);
Colin S. Dawson, Tucson, AZ (US);
Erick C. Kissel, Tucson, AZ (US);
Howard N. Martin, Vail, AZ (US);
Jonathan M. Haswell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/856,688

(22) Filed: Sep. 17, 2007

(65) Prior Publication Data
US 2009/0077140 A1 Mar. 19, 2009

(51) Int. Cl.
*G06F 17/30* (2006.01)
*G06F 7/00* (2006.01)
*G06F 11/14* (2006.01)

(52) U.S. Cl.
CPC .................................. *G06F 11/1469* (2013.01)
USPC .......................................... 707/640; 707/651

(58) Field of Classification Search
CPC .................................................. G06F 11/1469
See application file for complete search history.

(56) References Cited

U.S. PATENT DOCUMENTS

| | | | | |
|---|---|---|---|---|
| 4,318,184 A | * | 3/1982 | Millett et al. | 1/1 |
| 4,611,298 A | * | 9/1986 | Schuldt | 1/1 |
| 5,018,060 A | * | 5/1991 | Gelb et al. | 1/1 |
| 5,819,043 A | * | 10/1998 | Baugher et al. | 709/222 |
| 5,963,967 A | * | 10/1999 | Umen et al. | 715/236 |
| 6,065,018 A | * | 5/2000 | Beier et al. | 707/610 |
| 6,148,412 A | * | 11/2000 | Cannon et al. | 714/6 |
| 6,185,666 B1 | * | 2/2001 | Murray et al. | 711/173 |
| 6,205,455 B1 | * | 3/2001 | Umen et al. | 715/236 |
| 6,366,987 B1 | * | 4/2002 | Tzelnic et al. | 711/162 |
| 6,952,757 B2 | | 10/2005 | Carlson et al. | |
| 6,981,117 B2 | | 12/2005 | Patel et al. | |
| 7,003,628 B1 | * | 2/2006 | Wiedenman et al. | 711/118 |
| 7,062,628 B2 | | 6/2006 | Amano | |
| 7,167,856 B2 | * | 1/2007 | Lawder | 1/1 |
| 7,191,182 B2 | * | 3/2007 | Anonsen et al. | 1/1 |
| 2003/0154220 A1 | * | 8/2003 | Cannon | 707/204 |
| 2003/0177149 A1 | * | 9/2003 | Coombs | 707/204 |
| 2004/0010487 A1 | * | 1/2004 | Prahlad et al. | 707/1 |
| 2004/0107226 A1 | * | 6/2004 | Autrey et al. | 707/204 |
| 2004/0254964 A1 | * | 12/2004 | Kodama et al. | 707/204 |

(Continued)

OTHER PUBLICATIONS http://pic.dhe.ibm.com/infocenter/tsminfo/v6r3/index.jsp; IBM; Jan. 2007.*

(Continued)

*Primary Examiner* — Shew-Fen Lin
*Assistant Examiner* — Jermaine Mincey
(74) *Attorney, Agent, or Firm* — Century IP Group, Inc.; F. Jason Far-hadian, Esq.

(57) ABSTRACT

Systems and methods for retrieving data from a storage system having a plurality of storage pools are provided. The method comprises processing configurable data retrieval instructions to determine a first storage pool from which target backup data is to be retrieved, in response to a data restore request; and retrieving the target backup data from the first storage pool to satisfy the restore request. The configurable data retrieval instructions are managed by a source external to the storage system with administrative authority to change the configurable data retrieval instructions to optimize data restoration from the storage system.

8 Claims, 5 Drawing Sheets

(56) References Cited

U.S. PATENT DOCUMENTS

| | | | |
|---|---|---|---|
| 2005/0060330 A1* | 3/2005 | Sonoda et al. | 707/100 |
| 2005/0246398 A1* | 11/2005 | Barzilai et al. | 707/204 |
| 2005/0257013 A1 | 11/2005 | Ma | |
| 2006/0069861 A1* | 3/2006 | Amano | 711/114 |
| 2006/0129508 A1* | 6/2006 | Cannon et al. | 707/1 |
| 2006/0282628 A1 | 12/2006 | Ueoka et al. | |
| 2007/0179994 A1* | 8/2007 | Deguchi et al. | 707/202 |
| 2007/0185936 A1* | 8/2007 | Derk et al. | 707/204 |

OTHER PUBLICATIONS

IBM Tivoli Storage Management Concepts; IBM; Redbook;2006.*

* cited by examiner

DATA RECOVERY IN A HIERARCHICAL DATA STORAGE SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to data storage and, more particularly, to a system and method for managing data storage according to status of stored data and a defined hierarchy of storage pools.

BACKGROUND

To improve efficiency of data recovery in a computing environment, data can be stored in a storage hierarchy which can be comprised of one or more data storage pools. Generally, each storage pool includes multiple storage volumes. A volume can be a standard file system file, a tape cartridge or an optical cartridge, for example. Each pool and each volume within each pool may have a predetermined data access speed based on the hardware used to access the volume. Often, the primary backup data is stored on more expensive high-speed storage mediums (e.g., disk drives) and the secondary backup data is stored on less expensive and slower data storage mediums (e.g., tapes or optical disks).

The above approach provides both a level of cost efficiency and a degree of data redundancy, which is useful in case the primary backup data is inaccessible. If a storage pool or medium in which the primary backup data is stored is unavailable, or if the target backup data on the medium is corrupted, the slower storage mediums will have to be accessed according to a preconfigured (i.e., built-in) access hierarchy to retrieve another copy of target backup data. The access hierarchy defines the order in which the storage pools are to be searched.

Unfortunately, the above approach is not optimal in that it can lead to long delays in finding the target data from among sets of active and inactive backup data which are mixed together. Also, longer delays are possible when the needed data is to be retrieved from a slow speed or remotely located storage medium. Even further, in the currently available data storage systems, a system administrator cannot customize or update the search hierarchy that is built in the backup system, even if a more desirable search hierarchy is possible.

Accordingly, data storage methods and systems are needed that can overcome the aforementioned shortcomings.

SUMMARY

The present disclosure is directed to systems, methods and corresponding products that facilitate efficient data recovery from redundant data storage systems.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for retrieving data from a storage system having a plurality of storage pools is provided. The method comprises processing configurable data retrieval instructions to determine a first storage pool from which target backup data is to be retrieved, in response to a data restore request; and retrieving the target backup data from the first storage pool to satisfy the restore request. The configurable data retrieval instructions are managed by a source external to the storage system with administrative authority to change the configurable data retrieval instructions to optimize data restoration from the storage system.

In accordance with one aspect of the invention, a system for retrieving data from a storage system having a plurality of storage pools is provided. The system comprises logic units for processing configurable data retrieval instructions to determine a first storage pool from which target backup data is to be retrieved, in response to a data restore request; and retrieving the target backup data from the first storage pool to satisfy the restore request.

In another embodiment, a computer program product comprising a computer useable medium having a computer readable program is provided. The computer readable program when executed on a computer causes the computer to perform above-mentioned operations.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate managing data storage according to status of stored data and a defined hierarchy of storage pools.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
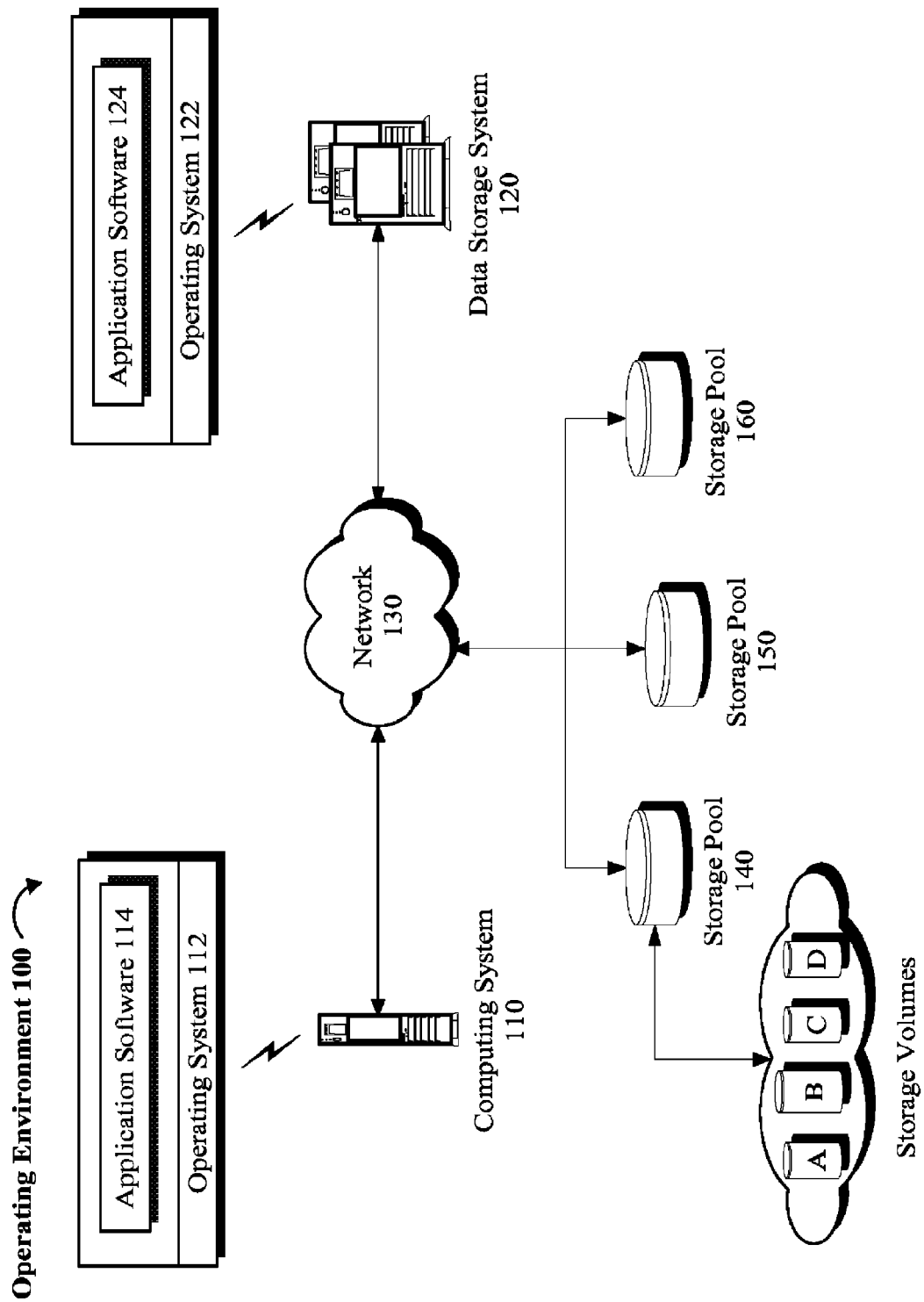
FIG. 1 illustrates an exemplary operating environment in accordance with one or more embodiments of the invention in which a data storage system is implemented.

Referring to FIG. 1, an operating environment 100 is illustrated in which a computing system 110 is coupled to a data storage system 120 in a network 130. The term "coupled" as disclosed here refers to a logical or physical relationship or connection (wired, wireless or combination thereof) established between various network components, over which said components can communicate. Network 130 may be a storage network for providing computing system 110 and data storage system 120 with access to storage pools 140, 150 and 160. Optionally, storage pools 140, 150, and 160 may be directly attached (via SCSI or FC adapter) to data storage system 120.

Storage pools 140, 150, 160 may comprise volumes, such as disk drives, tape cartridges, optical disks, etc. As shown, for example, storage pool 140 may comprise several storage volumes A, B, C or D. Depending on implementation, volume A may represent one or more disk drives, volume B may represent one or more tape cartridges, volume C may represent one or more optical disks, and so on. Thus, for example, storage pool 140 may comprise volumes of disk drives, while storage pool 150 may comprise volumes of tape cartridges.

Application software 114 may be executed on top of operating system 112 running on computing system 110 such that application software 114 can submit requests for access to data stored on storage pools 140, 150, 160, for example. Application software 124 may be executed on top of operating system 122 running over data storage system 120 such that application software 124 can service data access requests submitted by computing system 110 or other computing systems coupled to network 130.

Figure 2:
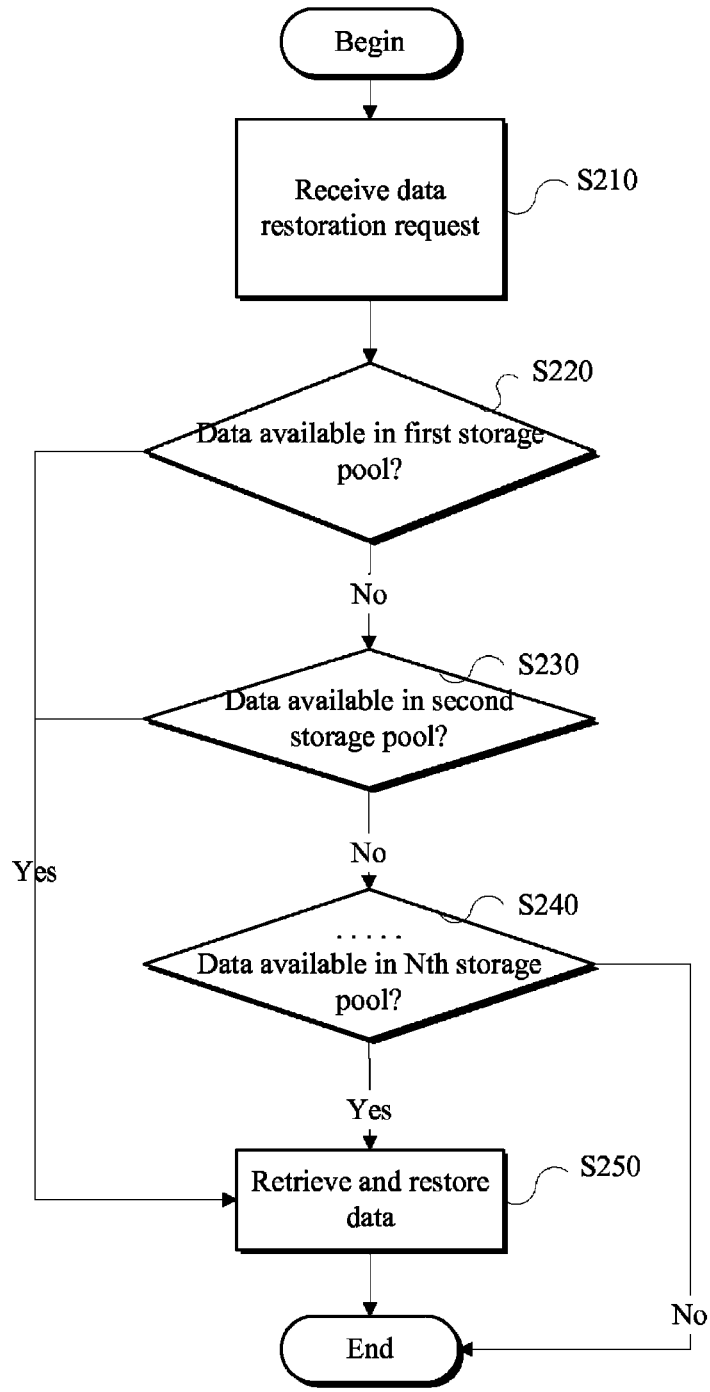
FIG. 2 is a flow diagram of a method for restoring data in a hierarchical data storage system, in accordance with one embodiment.

Referring to FIGS. 1 and 2, in one embodiment, application software 124 may be implemented to backup and restore data for computing systems coupled to network 130. As such, data locally stored on computing system 110 can be backed up and stored on storage pools 140, 150 or 160. Further, application software 124 may be implemented to service a data restoration request from, for example, computing system 110 (S210).

In the following, one or more exemplary embodiments are disclosed as applicable to backup data and backup storage systems. It is noteworthy, however, that the scope of the invention should not be construed as limited to backup data or backup systems, exclusively. That is, depending on implementation, the concepts and principles suggested herein may equally apply without limitation to other types of storage system or data, such as archive and space-managed (HSM) data, and to storage system not fully dedicated to managing backup data. Accordingly, in different embodiments, the subject storage system and disclosed principles may be utilized to manage any type of data, backup data being disclosed here by way of example, without detracting from the scope of the invention.

In one embodiment, a data restoration request may be submitted if computing system 110 has had a failure which resulted in data loss, or if a user wishes to access an older version of data which is no longer locally available to computing system 110. In accordance with one aspect of the invention, backup data can be stored in various data pools, such as active data pools (ADPs) and non-active data pools (non-ADPs).

Active data refers to the most recent backup version of a file, for example. Non-active or inactive data refers to older versions and corresponds to a file that has been updated or deleted from the system being backed up, for example. Accordingly, ADPs are storage pools that comprise active versions of backup data and non-ADPs comprise previous versions of backup data. In some embodiments, non-ADPs comprise both active and inactive versions of backup data.

Active versions of backup data continue to be stored in ADPs, as older versions are deactivated and removed during a reclamation process. The reclamation process is applied to storage volumes comprising tapes or other sequentially classified/treated storage media such that information comprising, for example, both inactive and active data is copied from said storage volumes to fewer volumes. Preferably, for ADPs, the reclamation process reclaims (i.e., copies) active versions of backup data from a volume that has a large amount of deleted or inactive files, to a volume within the same ADP, for example.

In one embodiment, the storage volume (e.g., tapes, disks, etc.) from which the data is copied are then added to a scratch pool of available media. The scratch pool may be selected and used to store future data. The reclamation process, thus, improves storage capacity utilization by consolidating active data from multiple storage volumes to fewer storage volumes. Another benefit of using fewer volumes is that large restore requests can be satisfied with fewer media mounts (tape mounts), because more useful data is stored on each volume. Reclamation also improves access time, since it is not necessary to skip inactive data to get to the active data on the storage volume.

Active data may be copied from non-ADP storage pools to ADPs. Additionally, a simultaneous write function may be used to automatically write active backup data to ADPs at the same time the backup data is written to a non-ADP storage pool. For example, data may be written to an ADP, if the data belongs to a computing system in network 130 wherein a policy definition or a replication protocol is defined to direct active data to be written to the ADP.

As such, ADPs provide an expedient means of recovering from disasters or media failures because the most recently backed up version of data may be quickly located without having to position past inactive data. Active data pools may use any type of sequential or random access storage (e.g., a tape device class or a FILE device class). In some embodiments, a random access disk is used for data backup and storage in a sequential manner, so that a reclamation process can be applied to it. A FILE device class refers to using files on magnetic disk storage as volumes that store data sequentially as if on tape.

For example, in one embodiment, active data pools are associated with a FILE device class for fast restores because FILE volumes may not need to be physically mounted and because a server may not need to position past inactive files that do not have to be restored. In a certain embodiment, active data pools may use removable media, such as tape or optical disks that offer similar benefits noted above. Although tapes are mounted, a server may not need to position past inactive files.

Referring back to FIGS. 1 and 2, data storage pools 140, 150, 160 comprise data pools that may be used in one or more embodiments to backup and restore data in data storage system 120 as provided in more detail below. In one embodiment, when a request for restoring data is received, data storage system 120 attempts to access a first storage pool (e.g., storage pool 140) to retrieve a backup copy of the data to be restored, by determining whether the data is available in the first storage pool (S220).

If the data is not available in the first storage pool, data storage system 120 attempts to determine if the data is available in a second storage pool (e.g., storage pool 150) (S230). In a similar manner, data storage system 120 may continue to attempt to access additional storage pools (e.g., Nth storage pool) (S240) until the requested data is accessed within a storage pool; thereafter the target backup data is retrieved and restored to satisfy the restoration request (S250).

In one embodiment, a hierarchical order may be defined to indicate the order in which targeted backup data in the storage hierarchy is to be accessed. This hierarchical order may be set by a source external to the data storage system 120, such as a human administrator with authority to create, edit and update configurable data retrieval instructions that help optimize data restoration process performed by data storage system 120.

Figure 3:
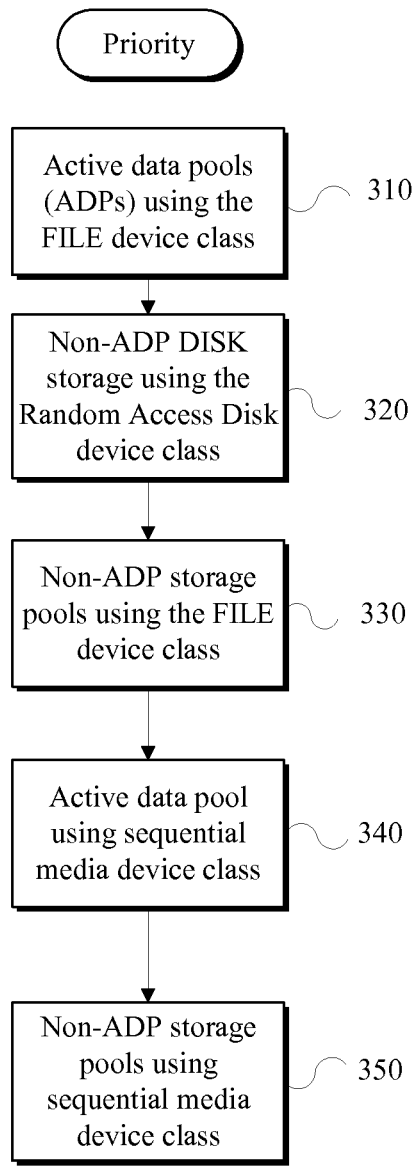
FIG. 3 is a block diagram of an exemplary group of storage pools implemented in accordance with one embodiment.

Referring to FIG. 3, in an exemplary embodiment, the data retrieval instructions provide a hierarchical data retrieval policy in which the following exemplary categories of storage are defined to designate a preferred order for retrieving backup data from storage pools comprising ADPs and non-ADPs. It should be emphasized, however, that the following hierarchical order is provided by way of example and should not be construed as limiting the scope of the invention to such exemplary embodiments.

Category 1—disk media represented as sequential media comprising ADPs, using the FILE device class (310)
Category 2—disk media represented as random-access media comprising non-ADPs, using the Random Access Disk device class (320)
Category 3—disk media represented as sequential media comprising non-ADPs, using the FILE device class (330)
Category 4—sequential media comprising ADPs, using sequential media device class other than FILE (340)
Category 5—sequential media comprising non-ADP storage pools, using sequential media device class other than FILE (350)

Accordingly, in some embodiments, an ADP comprising active backup data stored on at least one high-speed data storage medium configured as a sequential access data retrieval medium may be checked first. Thereafter, a non-ADP comprising active and non-active backup data stored on at least one high-speed data storage medium configured as a random access data retrieval medium may be checked.

In some embodiments, the configurable data retrieval instructions designate a second non-ADP as an alternate data storage pool, wherein the second non-ADP comprises active and non-active backup data stored on at least one high-speed data storage medium configured as a sequential access data retrieval medium. In a certain embodiment, a second ADP comprising active backup data stored on at least one low-speed data storage medium configured as a sequential access data retrieval medium is designated as another storage pool, in the event the other storage pools are unavailable.

In some embodiments, the configurable data retrieval instructions designate a third non-ADP as a data storage pool, when the target backup data is not retrievable from the other storage pool. The third non-ADP comprises active and non-active backup data stored on at least one low-speed data storage medium configured as a sequential access data retrieval medium. Depending on implementation, a high-speed data storage medium comprises a magnetic hard disk; and a low-speed data storage medium comprises at least one of a magnetic tape or an optical disk.

The system administrator may update the data retrieval instructions so that various storage pools are interchangeably assigned to have different hierarchical order, depending on changes to system architecture and/or installation of new storage devices. For example, where multiple storage pools are available, the administrator may configure the data retrieval instructions to designate a first storage pool as the first location to be searched, wherein the first storage pool provides best data access rate among the plurality of data storage pools available.

Depending on implementation, the data accessibility may be determined based on availability of a volume in a storage pool (e.g., whether a volume is mounted, is in use, is in an automated storage library, or is in an offsite location). Preferably, the configurable data retrieval instructions are implemented according to a point system, wherein the first storage pool is selected from among a plurality of storage pools according to a total number of points assigned to the first storage pool, wherein the points indicate comparative data access rate for each of said plurality of storage pools.

For example, storage category priorities may be defined wherein higher numbers define a higher level of importance in the access priority such that a category 1 (e.g., FILE ADP) is assigned 1000 points, a category 2 (e.g., DISK non-ADP) is assigned 800 points, a category 3 (e.g., FILE non-ADP) is assigned 600, etc. Furthermore, storage pool intra-category priorities may be also defined by, for example, giving 90 to zero points to storage volumes (e.g., A through D) depending on their availability.

In one scenario, for example, the system administrator may know that storage pool 140, a newly installed storage device in category 2, has a faster access speed than storage pool 150 in the same category. As such, the administrator may update the configurable data retrieval instructions so that storage pool 140 is accessed before storage pool 150, in response to a data restore request for target data stored in the respective storage category.

The following is an exemplary algorithm that may be used to assign storage category priorities base on a point system. It is emphasized that the following algorithm is provided for the purpose of example and should not be construed as limiting the scope of the invention:

---

Storage pool category priorities - used for ordering storage pools from which data can be restored (higher value designates higher priority):
    FILE ADP: 1000
    DISK non-ADP: 800
    FILE non-ADP: 600
    Sequential ADP: 400
    Sequential non-ADP: 200
Storage pool intra-category priorities - used for the case where there is more than one storage pool in the same storage pool category:
    90 to 0
    Default storage pool intra-category priority 50
Volume access priorities - used for volume accessibility in a storage pool:
    mounted and idle: 9
    not mounted, but in automated library: 7
    not mounted, but in non-automated library: 5
    offsite: 3
    unavailable/destroyed: 0
For every storage pool the file is stored in,
    Set newPriority to storage pool category priority.
        Add newPriority to storage pool intra-category priority.
        Get the volume access priority.

-continued

```
If the volume access priority is 3 or 0,
    Evaluate next storage pool.
    Add newPriority to volume access priority.
    If bestPool has not been set,
        Set bestPool to storage pool being evaluated.
        Set bestPoolPriority to newPriority.
        Evaluate next storage pool.
    If newPriority is greater than bestPoolPriority,
        Set bestPool to storage pool being evaluated.
        Set bestPoolPriority to newPriority.
        Evaluate next storage pool.
```

In one embodiment, each volume in a storage pool inherits a priority level based on its availability, and the priority level for each storage pool is assigned according to its category and intra-category. Accordingly, the system administrator may be given broad authority to fully customize the access priority for different storage pools and volumes within different storage resources.

In different embodiments, the invention can be implemented either entirely in the form of hardware or entirely in the form of software, or a combination of both hardware and software elements. For example, computing systems 110, 120 and application software 114, 124 may comprise a controlled computing system environment that can be presented largely in terms of hardware components and software code executed to perform processes that achieve the results contemplated by the system of the present invention.

Figure 4:
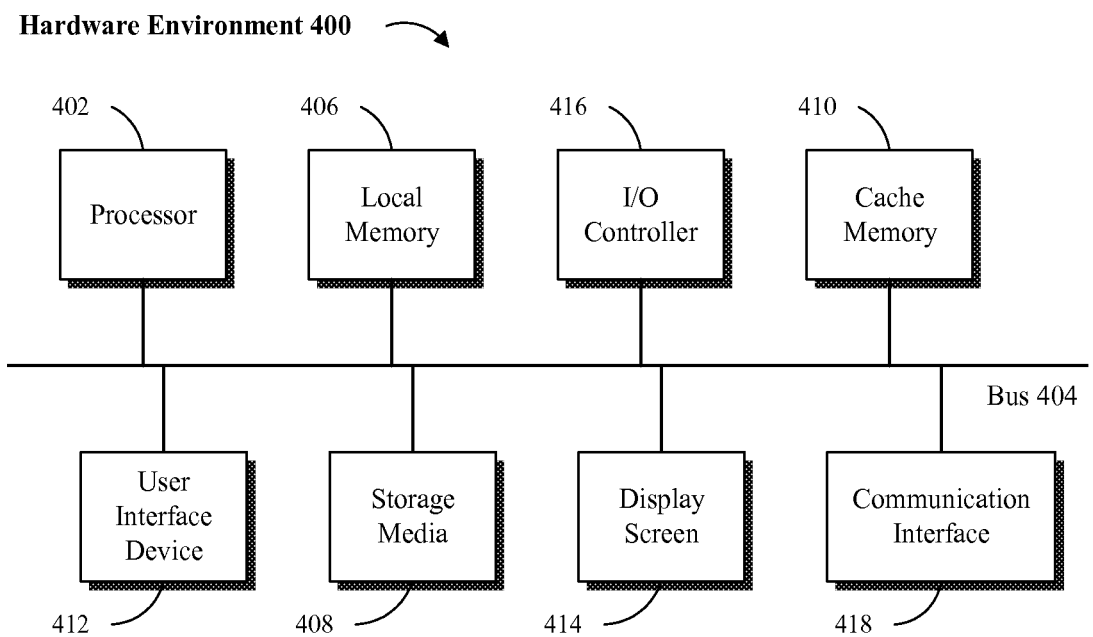
FIGS. 4 and 5 are block diagrams of hardware and software environments in which a system of the present invention may operate, in accordance with one or more embodiments.
Figure 5:
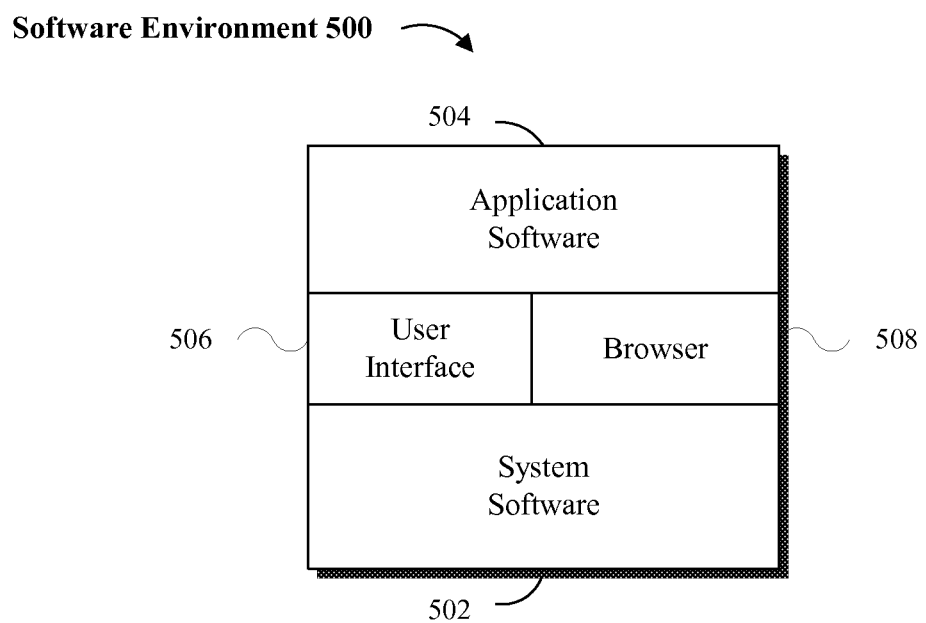

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, application software 114, 124 may be implemented as system software 502 or application software 504 executed on one or more hardware environments to facilitate memory sharing among computing systems in network 130. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing system 110 and server software is executed on a computing system 120.

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A data restoration method comprising:
receiving a restoration request to restore target data to a first data storage medium from a backup copy of the target data stored in at least a second data storage medium, wherein a newest version of the target data is to be restored to the first data storage medium and wherein more than one backup copy of the target data is stored in at least the second data storage medium such that:
  an active backup version of the target data represents a copy of the target data that has been most recently backed up to at least the second data storage medium, and
  a non-active backup version of the target data represents a copy of the target data that has been backed up at a point in time prior to the active backup version to at least the second data storage medium;
wherein a first data pool in at least the second data storage medium comprises active backup versions of the target data,
wherein a second data pool in at least the second data storage medium, exclusive of the first data pool, comprises non-active back up versions of the target data,
wherein when a backup copy of the target data is created, the created backup copy of the target data is stored in the second data pool as the active backup version of the target data,
wherein after the active backup version of the target data is stored in the second data pool, a prior active backup version of the target data in the first data pool is marked as inactive,
wherein the inactive backup versions of the target data that are stored in the first data pool and are considered to be older versions of the active backup version in the second data pool are removed from the first data pool,
wherein the active backup version of the target data is copied from the second data pool to the first data pool so that the first data pool comprises the latest active backup version of the target data,
wherein the first data pool is configured to maintain the active backup version of the target data separate from the non-active backup versions of the target data, so that in response to receiving the restoration request, a search of content of the first data pool allows for the active backup version of the target data to be retrieved from the first data pool and restored without having to search through the non-active backup versions of the target data stored in the second data pool, thereby expediting restoration of the target data from the active backup version, and
wherein the second data pool is updated to include an older version of a newly created backup version of the target data, in response to determining that a new backup version of the target data is created; and
restoring the target data to the first data storage medium from the active backup version of the target data in the first data pool.

2. The method of claim 1, wherein the prior active backup version of the target data marked inactive in the first data pool is further moved to the second data pool.

3. The method of claim 1, wherein when a backup copy of the target data is created, an active backup version of the target data is stored in the second data pool, and a copy of the active backup version stored in the second data pool is created in the first data pool.

4. The method of claim 1, wherein after the active backup version of the target data created in the second data pool is copied from the second data pool to the first data pool, the active backup version of the target data in the second data pool is removed.

5. The method of claim 2, wherein the prior active backup version of the target data is moved from the first data pool to the second data pool by way of a reclamation process.

6. The method of claim 2, wherein the prior active backup version of the target data in the first data pool that is marked as inactive is time stamped to distinguish from an older prior active backup version of the target data that was marked as inactive earlier in time.

7. The method of claim 1, wherein the prior active backup version of the target data that is marked as inactive is time stamped to distinguish from an older prior active backup version of the target data that was marked as inactive earlier in time.

8. The method of claim 1, wherein the first data pool resides in the second data storage medium and the second data pool resides in a third data storage medium, wherein data stored in the second data storage medium is accessible at a faster rate than data stored in the third data storage medium.

* * * * *